No. 689,715. Patented Dec. 24, 1901.
R. GRISWOLD.
DEVICE FOR STACKING LOOSE HAY OR STRAW.
(Application filed June 14, 1901.)
(No Model.) 2 Sheets—Sheet 1.

WITNESSES:
Geo. W. Naylor
J. Bedecker

INVENTOR
Robert Griswold
BY
ATTORNEYS

No. 689,715. Patented Dec. 24, 1901.
R. GRISWOLD.
DEVICE FOR STACKING LOOSE HAY OR STRAW.
(Application filed June 14, 1901.)
(No Model.) 2 Sheets—Sheet 2.

WITNESSES: INVENTOR
Robert Griswold
BY
ATTORNEYS

UNITED STATES PATENT OFFICE.

ROBERT GRISWOLD, OF CARR, COLORADO.

DEVICE FOR STACKING LOOSE HAY OR STRAW.

SPECIFICATION forming part of Letters Patent No. 689,715, dated December 24, 1901.

Application filed June 14, 1901. Serial No. 64,553. (No model.)

*To all whom it may concern:*

Be it known that I, ROBERT GRISWOLD, a citizen of the United States, and a resident of Carr, in the county of Weld and State of Colorado, have invented a new and Improved Device for Stacking Loose Hay or Straw, of which the following is a full, clear, and exact description.

The purpose of the invention is to provide a portable machine adapted for carrying and for unloading loose hay and straw and facilitate stacking the same and to so construct the device that a pivoted carrier will operate backward and forward upon a body-section, which body-section is capable of being moved from place to place and held firmly in its adjusted position.

Another purpose of the invention is to improve upon the construction set forth in the patent granted to me December 25, 1900, No. 664,546, to the extent that the portion of the device receiving a bundle of hay or straw is movable over the body of the device.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both figures.

Figure 1:
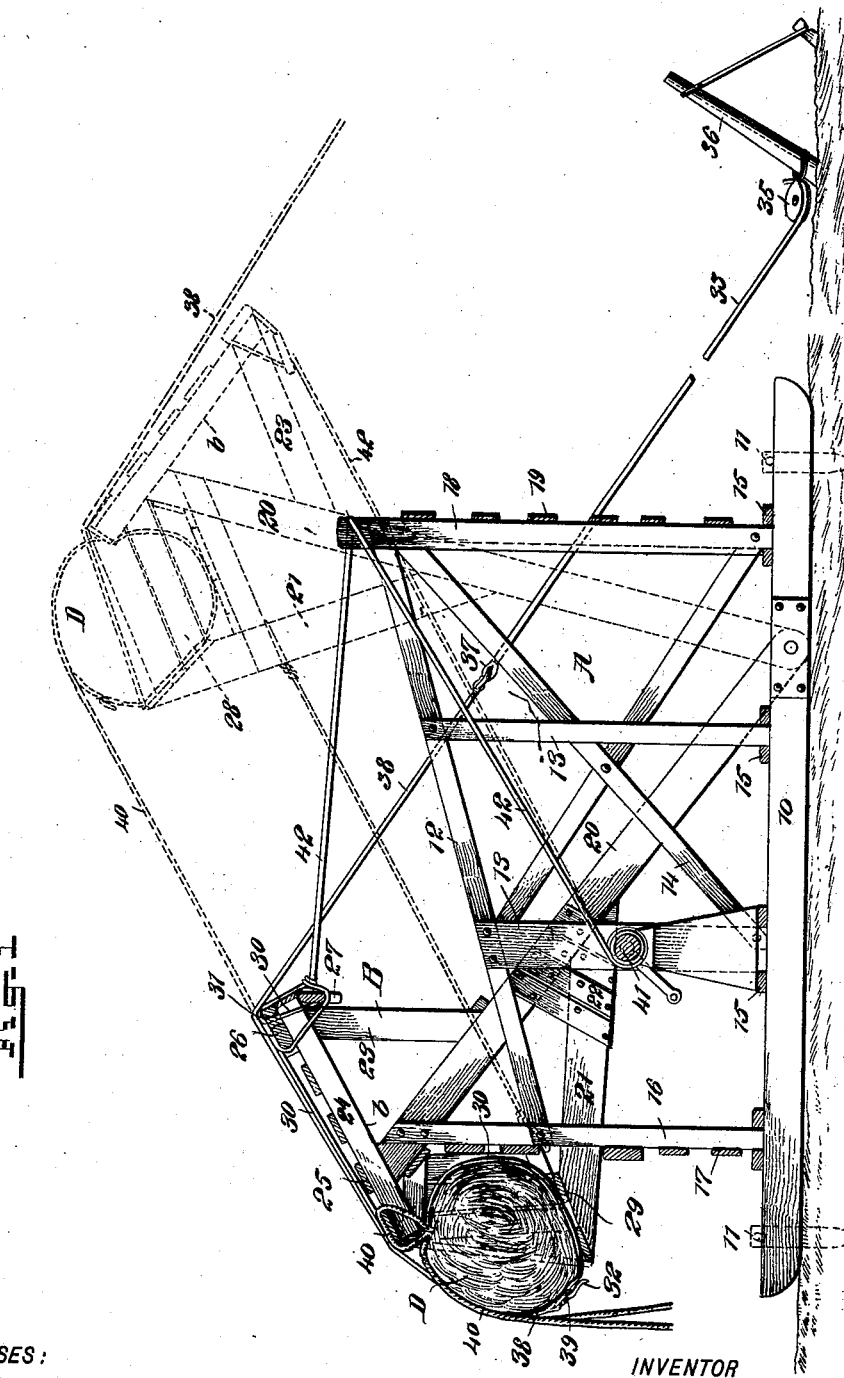
Figure 2:
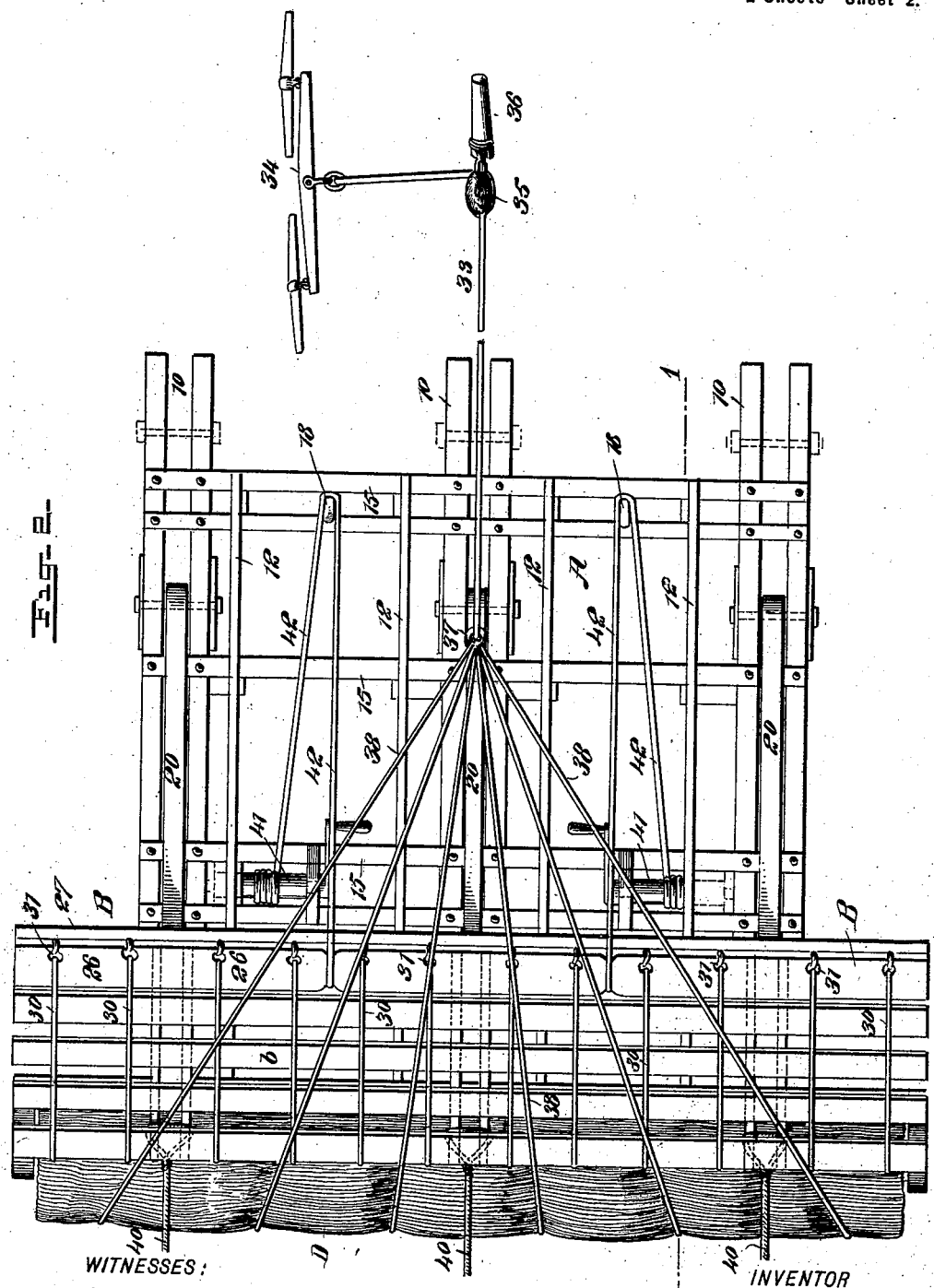

Figure 1 is a section taken from front to rear of the machine, practically on the line 1 1 of Fig. 2, showing the straw-carrying section in two positions; and Fig. 2 is a plan view of the device.

The device consists practically of a body-section A and a carrier-section B, the carrier-section being movable upon and over the body-section. The base of the body-section A consists of a series of runners 10, which may be fastened to the ground by stakes or pins 11, as shown in Fig. 1. The top of the body consists of a series of bars 12, extending from front to rear, and these bars are given a downward inclination from the rear in direction of the front. The upper bars 12 are connected with the base by suitable vertical bars 13, in connection with which diagonal braces 14 are employed, as is best shown in Fig. 1, and the runner-beams of the base of the body-section A are connected by bars or beams 15, extending from side to side of the device.

The front standards 16 of the body portion of the device are connected at the front by slats 17, and the rear standards 18 are connected by slats 19; but these slats do not extend across the central portion of the device.

The carrier-section B of the device consists of two or more, usually three, arms 20, which are pivoted at their lower ends to the base portion of the body-section A of the device. These arms when in their normal position extend upward and forward above and beyond the front of the device. Branch arms 21 extend from the main arms 20 at what is normally the forward portions and at a point below their forward portions, as is also shown in Fig. 1, and these branch arms are usually connected with the main arm 20 by bracing-strips 22 or their equivalent. An upright standard 23 is secured to the upper edge of each arm 20 of the carrier-section near its upper end. These standards 23, together with the outer ends of the arms 20, serve to support the upper portion $b$ of the carrier-section B of the device, which upper portion preferably consists of longitudinal bars 24, extending from front to rear, and transverse slats 25, together with a main transverse beam or bar 26 at the upper rear portion of the top of the carrier, as is best shown in Fig. 2, and a downwardly-extending beam 27 is located at the rear portion of the upper part of the carrier, as is illustrated in Fig. 1.

Hangers 28 extend down from the front part of the upper portion of the carrier B, and these hangers are connected with a platform 29, which is supported on the beveled outer end portions of the branch arms 21, as is also best shown in Fig. 1. This platform 29 is usually made slanting.

A series of ropes or chains 30 is located upon the upper portion of the carrier B, and the rear ends of these ropes or chains are passed through openings 31 in the rear beam 26 and likewise through openings in the downwardly-extending beam 27. These ropes or chains 30 extend across the upper face of the carrier and down at the front and are of sufficient length when the carrier is in a forward position to lie upon the platform 29 and extend beyond the front edge of the said platform. Each rope 30 is made to terminate at its forward end in a hook 32. These ropes or chains 30 are usually twelve in number and are used in connection with a draft-rope 33, which draft-rope extends across the upper central portion of the structure to the rear and is provided at its rear end with an attached draft-tree 34. The rear portion of the draft-rope 33 passes over a pulley 35, secured in any suitable or approved manner to a stake 36, driven into the ground or otherwise permanently secured. The forward end of the draft-rope 33 is provided with a ring 37, and to this ring 37 a series of branch ropes 38, usually six in number, are secured. These branch ropes pass over the top of the carrier and down at the front portion of the structure and terminate at their forward ends in rings 39. Two of the ropes or chains 30, attached to the carrier, are adapted to be hooked to each ring 37 of a branch of the draft-rope 33, as shown in Fig. 1.

The carrier B being in its forward position, (shown in both Figs. 1 and 2,) the ropes or chains 30, attached to the carrier, are dropped upon the platform 29, and the hay or straw is then tossed upon the platform upon said ropes or chains 30. The bundle of hay or straw thus formed is held in shape, and the straw or hay is prevented from leaving the platform 29 through the medium of ropes 40, which are secured at intervals to the forward edge of the upper portion of the carrier B and are manipulated at the ground by attendants, so that by holding these guide-ropes 40 more or less taut the bundle of hay or straw which is in process of formation will not slip from the platform, it being understood that the guide-ropes 40 are slackened when an extra supply of hay or straw is thrown to the bundle. When the bundle D is completed, the branch ropes 38 of the draft-rope 33 are drawn downward and forward in engagement with the front portion of the bundle and are secured to the carrying ropes or chains 30 through the medium of the hooks 32 of the latter, as is clearly shown in Fig. 1. By drawing rearward on the draft-rope 33 the carrier B is moved upon its pivots in direction of the rear and until it reaches a point shown in dotted lines in Fig. 1, the arms 20 then resting upon the rear portion of the structure, and by further drawing on the draft-rope 33 the bundle is rolled down the now rearwardly-inclined upper face of the carrier and is dropped to the ground and is released by disconnecting its hooks 32 from the rings 39.

The carrier B may be carried forward in any suitable or approved manner. Usually, however, this is accomplished by providing two or more windlasses 41, suitably mounted in the body portion of the device, and attaching to each windlass one end of a rope or chain 42, which rope or chain 42 is carried rearward and into a groove formed upon the upper extending portions of the rear standards 18. Said ropes or chains 42 are then carried to the rear portion of the upper part of the carrier B and are tied thereto or otherwise fastened.

When the carrier is in its rear or dumping position and the windlasses 41 are operated, the carrier will be drawn forward until it passes its center of gravity, whereupon it will drop of itself to its normal position.

I desire it to be understood that the draft-rope 33 may be run otherwise than illustrated. For example, it may be passed over pulleys located upon supports placed any distance at the rear of the device.

Having thus described my invention, I claim as new and desire to secure by Letters Patent—

1. In a device for stacking hay and straw, the combination, with the body-section or base-frame A, of the carrier section or frame B, pivoted thereon, and adapted to project over the inclined top portion of the body-section, tie-ropes on the carrier-section, and hoist-ropes which are adapted to engage the tie-ropes and thus secure a bundle while being raised, as shown and described.

2. In a device for stacking hay and straw, a body-section, a carrier-section for the bundle, pivotally mounted upon the body-section and adapted to move to and from a forward position, tie-ropes secured to the carrier-section, a hoist-rope provided with branches adapted for locking engagement with the tie-ropes, a return mechanism for the carrier-section, and guide-strands secured to the carrier and arranged for engagement with the bundle thereon, as described.

3. In a device for stacking hay and straw, the combination with a body-section mounted to slide upon the ground and having a downwardly and forwardly inclined top, and means for anchoring the body-section, of a carrier-section mounted to swing from the front to the rear of the body, a platform for a bundle formed upon the carrier, tie-ropes secured to the carrier and adapted to drop upon its platform, a hoist-rope, and a series of branch ropes attached to the hoist-rope, which branch ropes extend over the carrier and are adapted for locking engagement with the tie-ropes, the hoist-rope and its branches being independent of the body and carrier sections of the device, as specified.

4. In a device for stacking hay and straw, the combination, with a body-section mounted to slide upon the ground and having a downwardly and forwardly inclined top, and means for anchoring the body-section, of a carrier-section mounted upon the body and adapted to swing above the same from the front to the rear of the body, a platform for bundles, located at the forward portion of the carrier, tie-ropes secured to the carrier and adapted to drop upon its platform, a hoist-rope, a series of branch ropes attached to the hoist-rope, which branch ropes extend over the carrier and are adapted for locking engagement with the tie-ropes at the platform of the carrier, a windlass located upon the body, a return-rope attached to said windlass and to the upper rear portion of the carrier, and a guide for said return-rope at the rear portion of the body-section of the device, as set forth.

In testimony whereof I have signed my name to this specification in the presence of two subscribing witnesses.

ROBERT GRISWOLD.

Witnesses:
G. M. HOUSTON,
B. D. SANBORN.